(12) United States Patent
Ito

(10) Patent No.: US 8,619,309 B2
(45) Date of Patent: Dec. 31, 2013

(54) IMAGE PROCESSING APPARATUS

(71) Applicant: Oki Data Corporation, Tokyo (JP)

(72) Inventor: Toshiyuki Ito, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 13/900,893

(22) Filed: May 23, 2013

(65) Prior Publication Data
US 2013/0250360 A1    Sep. 26, 2013

Related U.S. Application Data

(63) Continuation of application No. 12/796,113, filed on Jun. 8, 2010, now Pat. No. 8,472,059.

(30) Foreign Application Priority Data

Jun. 9, 2009  (JP) ................. 2009-138287

(51) Int. Cl.
G06F 3/12    (2006.01)
H04N 1/00   (2006.01)

(52) U.S. Cl.
USPC .......................................... 358/1.15; 358/1.6

(58) Field of Classification Search
None
See application file for complete search history.

(56) References Cited

U.S. PATENT DOCUMENTS

2006/0271675 A1   11/2006  Wakazono et al.

FOREIGN PATENT DOCUMENTS

| JP | 11-127298 A | 5/1999 |
| JP | 2000-059553 A | 2/2000 |
| JP | 2001-230789 A | 8/2001 |
| JP | 2006-339904 A | 12/2006 |

Primary Examiner — Dov Popovici
(74) Attorney, Agent, or Firm — Kubotera & Associates, LLC

(57) ABSTRACT

An image processing apparatus includes a capturing unit for capturing an image; an operation unit for inputting information specifying a specific information processing device among a plurality of information processing devices; an information request processing unit for externally transmitting an information acquisition request including a concurrent notification request and identification information identifying the specific information processing device; a destination determination processing unit for determining a transmission destination according to answer information relative to the information acquisition request; and an image information transmission processing unit for transmitting the image captured with the capturing unit to the transmission destination determined with the destination determination processing unit.

10 Claims, 20 Drawing Sheets

| Terminal information | TanakaTaroPC |
|---|---|

FIG. 6

| Terminal information | TanakaTaroPC |
|---|---|
| Host name | Dfg3432434 |
| IP address | 192.168.1.221 |
| Terminal information matching determination result | YES |

FIG. 7

| Terminal information | HanakoPC |
|---|---|
| Host name | GhhDfg343333222434 |
| IP address | 192.168.2.201 |
| Terminal information matching determination result | NO |

FIG. 8

| | |
|---|---|
| Number | 1 |
| Terminal information | Not registered |
| Host name | Not registered |
| IP address | Not registered |

FIG. 9

| | |
|---|---|
| Number | 1 |
| Terminal information | TanakaTaroPC |
| Host name | Dfg3432434 |
| IP address | 192. 168. 1. 221 |

FIG. 10

| | |
|---|---|
| Number | 1 |
| Terminal information | TanakaTaroPC |
| Host name | Dfg3432434 |
| IP address | 192. 168. 1. 221 |
| Number | 2 |
| Terminal information | TanakaTaroPC |
| Host name | Ereref4ggdf |
| IP address | 192. 168. 130. 12 |

FIG. 11

| Terminal information | TanakaTaroPC |
|---|---|
| Host name | Dfg3432434 |
| IP address | 192.168.1.221 |

FIG. 17

| Number | 1 |
|---|---|
| Terminal information | TanakaTaroPC |
| Host name | Dfg3432434 |
| IP address | 192.168.1.221 |
| Number | 2 |
| Terminal information | HanakoPC |
| Host name | Ereref4ggdf |
| IP address | 192.168.130.12 |
| Number | 3 |
| Terminal information | ichiroPC |
| Host name | Weee5666 |
| IP address | 192.168.30.45 |
| Number | 4 |
| Terminal information | Not registered |
| Host name | Not registered |
| IP address | Not registered |

FIG. 18

| Terminal information | TanakaTaroPC |
|---|---|
| Image format | JPG |

FIG. 26

| Number | Image format |
|---|---|
| 1 | JPG |
| 2 | BMP |
| 3 | GIF |
| 4 | TIFF |
| 5 | PCX |
| 6 | JBIG |
| 7 | Xif |
| 8 | wif |
| 9 | Not registered |

FIG. 27

| Number | TanakaTaroPC |
|---|---|
| Host name | Dfg3432434 |
| IP address | 192.168.1.221 |
| Terminal information matching determination result | YES |
| Image format support determination result | YES |
| Image format | JPG, BMP |

FIG. 28

| | |
|---|---|
| Terminal information | TanakaTaroPC |
| Host name | Dfg3432434 |
| IP address | 192.168.1.221 |
| Terminal information matching determination result | YES |
| Image format support determination result | NO |
| Image format | NONE |

FIG. 29

| | |
|---|---|
| Number | 1 |
| Terminal information | TanakaTaroPC |
| Host name | Dfg3432434 |
| IP address | 192.168.1.221 |
| Image format support determination result | YES |
| Image format | JPG, BMP |
| Number | 2 |
| Terminal information | Not registered |
| Host name | Not registered |
| IP address | Not registered |
| Image format support determination result | Not registered |
| Image format | Not registered |

IMAGE PROCESSING APPARATUS

CROSS-REFERENCE TO RELATED APPLICATIONS

This is a continuation application of a prior application Ser. No. 12/796,113, filed Jun. 8, 2010, allowed.

BACKGROUND OF THE INVENTION AND RELATED ART STATEMENT

The present invention relates to an image processing apparatus.

In a conventional network system, an image reading apparatus such as a copier, a facsimile, a scanner, a multi function product (MFP) and the like is connected through a network. For example, a multi function product and personal computers as a plurality of terminal devices are connected through a network.

In the conventional network system, the multi function product reads an image of an original in a push scanning mode, so that it is possible to transmit image data of the image of the original to a specific personal computer among the personal computers. In this case, a storage unit of the multi function product stores a transmission destination list, and the transmission destination list registers information for identifying each personal computer, i.e., terminal information, as a transmission destination. When the transmission destination list is displayed on a display unit of the multi function product, an operator selects the specific personal computer of the transmission destination in the transmission destination list, so that the image data are transmitted to the specific personal computer thus selected. (Refer to Patent Reference)
Patent Reference Japanese Patent Publication No. 2000-59553

In the conventional network system described above, it is not possible to transmit the image data to a personal computer whose terminal information is not registered in the transmission destination list. Further, when a personal computer is newly connected to the network and terminal information thereof is registered in the transmission destination list, it is necessary to obtain acknowledgment of an administrator of each personal computer. Accordingly, an operation of registering the terminal information becomes cumbersome. Further, when acknowledgment of an administrator is not obtained, it is not possible to register the terminal information of the personal computer in the transmission destination list.

In view of the problems described above, an object of the present invention is to provide an image reading apparatus and a network system capable of solving the problems of the conventional network system. In the present invention, it is possible to transmit image data to a personal computer whose terminal information is not registered in a transmission destination list.

Further objects and advantages of the invention will be apparent from the following description of the invention.

SUMMARY OF THE INVENTION

In order to attain the objects described above, according to an aspect of the present invention, an image reading apparatus includes a reading unit; a reading processing unit for reading an image of an original with the reading unit; an operation unit for inputting terminal information of a specific terminal device among a plurality of terminal devices whose terminal information for identification is set in advance; an information request processing unit for transmitting an information acquisition request to the terminal devices through concurrent notification to request specific information; a terminal device determination processing unit for identifying the specific terminal device according to answer information transmitted from the terminal devices relative to the information acquisition request; and an image data transmission processing unit for transmitting image data of the image of the original read with the reading processing unit to the specific terminal device thus identified.

In the present invention, the image reading apparatus includes the reading unit; the reading processing unit for reading the image of the original with the reading unit; the operation unit for inputting the terminal information of the specific terminal device among the plurality of terminal devices whose terminal information for identification is set in advance; the information request processing unit for transmitting the information acquisition request to the terminal device through concurrent notification; the terminal device determination processing unit for identifying the specific terminal device according to the answer information relative to the information acquisition request; and the image data transmission processing unit for transmitting the image data of the image of the original read with the reading processing unit to the specific terminal device thus identified.

In particular, in the present invention, the information request processing unit transmits the information acquisition request to the terminal device through concurrent notification. When an operator operates the operation unit, the terminal device determination processing unit identifies the specific terminal device according to the answer information from the terminal devices. Then, the image data transmission processing unit transmits the image data to the specific terminal device thus identified. Accordingly, it is possible to transmit the image data to the terminal device whose terminal information is not registered.

BRIEF DESCRIPTION OF THE DRAWINGS

FIG. 6 is a schematic view showing terminal information of the network system according to the first embodiment of the present invention;

FIG. 7 is a schematic view No. 1 showing an example of a response from the personal computer according to the first embodiment of the present invention;

FIG. 8 is a schematic view No. 2 showing another example of the response from the personal computer according to the first embodiment of the present invention;

FIG. 9 is a schematic view No. 1 showing an example of detail information stored in a storage unit of the multi function product according to the first embodiment of the present invention;

FIG. 10 is a schematic view No. 2 showing another example of the detail information stored in the storage unit of the multi function product according to the first embodiment of the present invention;

FIG. 11 is a schematic view No. 3 showing a further example of the detail information stored in the storage unit of the multi function product according to the first embodiment of the present invention;

FIG. 17 is a schematic view showing an example of a response from the personal computer according to the second embodiment of the present invention;

FIG. 18 is a schematic view showing an example of detail information stored in a storage unit of the multi function product according to the second embodiment of the present invention;

FIG. 26 is a schematic view showing an example of an image format of the multi function product according to the third embodiment of the present invention;

FIG. 27 is a schematic view showing an example of a support image format table of the multi function product according to the third embodiment of the present invention;

FIG. 28 is a schematic view showing an example of a response from the personal computer according to the third embodiment of the present invention;

FIG. 29 is a schematic view No. 1 showing an example of detail information stored in a storage unit of the multi function product according to the third embodiment of the present invention; and FIG. 30 is a schematic view No. 2 showing another example of the detail information stored in the storage unit of the multi function product according to the third embodiment of the present invention.

DETAILED DESCRIPTION OF PREFERRED EMBODIMENTS

Hereunder, embodiments of the present invention will be explained with reference to the accompanying drawings. In the following description, a network system will be explained. In the network system of the invention, a multi function product 11 as an image reading apparatus is connected to personal computers p1, p2, and p3 as a plurality of terminal devices through a network 13.

First Embodiment

Figure 1:
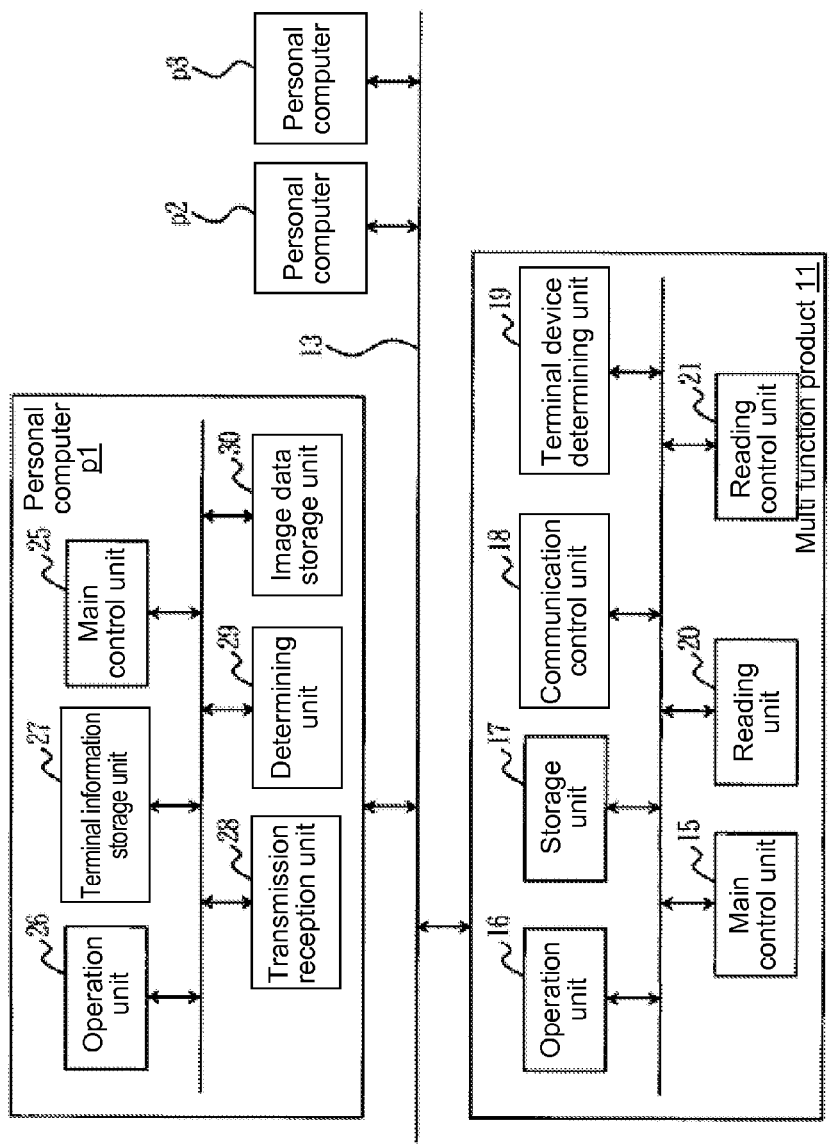
FIG. 1 is a block diagram showing a network system according to a first embodiment of the present invention.

A first embodiment of the present invention will be explained. FIG. 1 is a block diagram showing the network system according to the first embodiment of the present invention.

As shown in FIG. 1, the multi function product 11 is connected to the personal computers p1, p2, and p3 through the network 13.

In the embodiment, the multi function product 11 includes a main control unit 15 for controlling an entire operation of the multi function product 11; a reading unit 20 for reading an image of an original; a reading control unit 21 for controlling the reading unit 20; an operation unit 16 for inputting terminal information of one of the personal computers p1, p2, and p3 as a specific personal computer as a transmission destination to which an image is transmitted; a storage unit 17 for storing the terminal information input through the operation unit 16 by an operator; a communication control unit 18 for transmitting the terminal information to the personal computers p1, p2, and p3 on the network 13 through concurrent notification (broadcast or multicast); and a terminal device determining unit 19 for receiving a response from the specific personal computer through the communication control unit 18 to determine contents of the response.

In the embodiment, each of the personal computers p1, p2, and p3, for example, the personal computer p1 shown in FIG. 1, includes a main control unit 25 for controlling an entire operation of the personal computer p1; an operation unit 26 for the operator to input the terminal information; a terminal information storage unit 27 for storing the terminal information input through the operation unit 26; a transmission reception unit 28 for receiving the terminal information transmitted from the multi function product 11; a determining unit 29 for comparing the terminal information received through the transmission reception unit 28 with the terminal information stored in the terminal information storage unit 27; and an image data storage unit 30 for storing image data received through the transmission reception unit 28.

In the embodiment, the operation unit 16 or the operation unit 26 is formed of a touch panel, and functions as a display unit.

Figure 2:
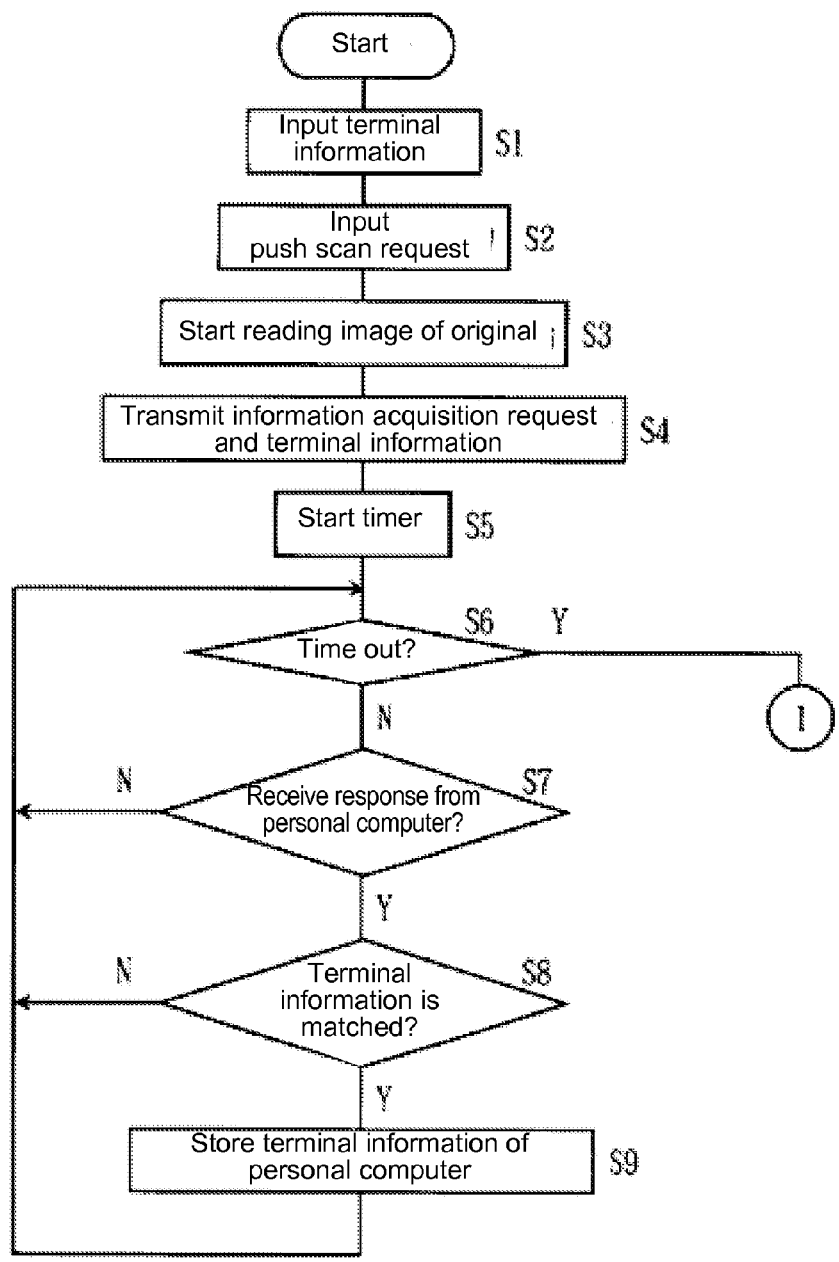
FIG. 2 is a flow chart No. 1 showing an operation of a multi function product according to the first embodiment of the present invention.
Figure 3:
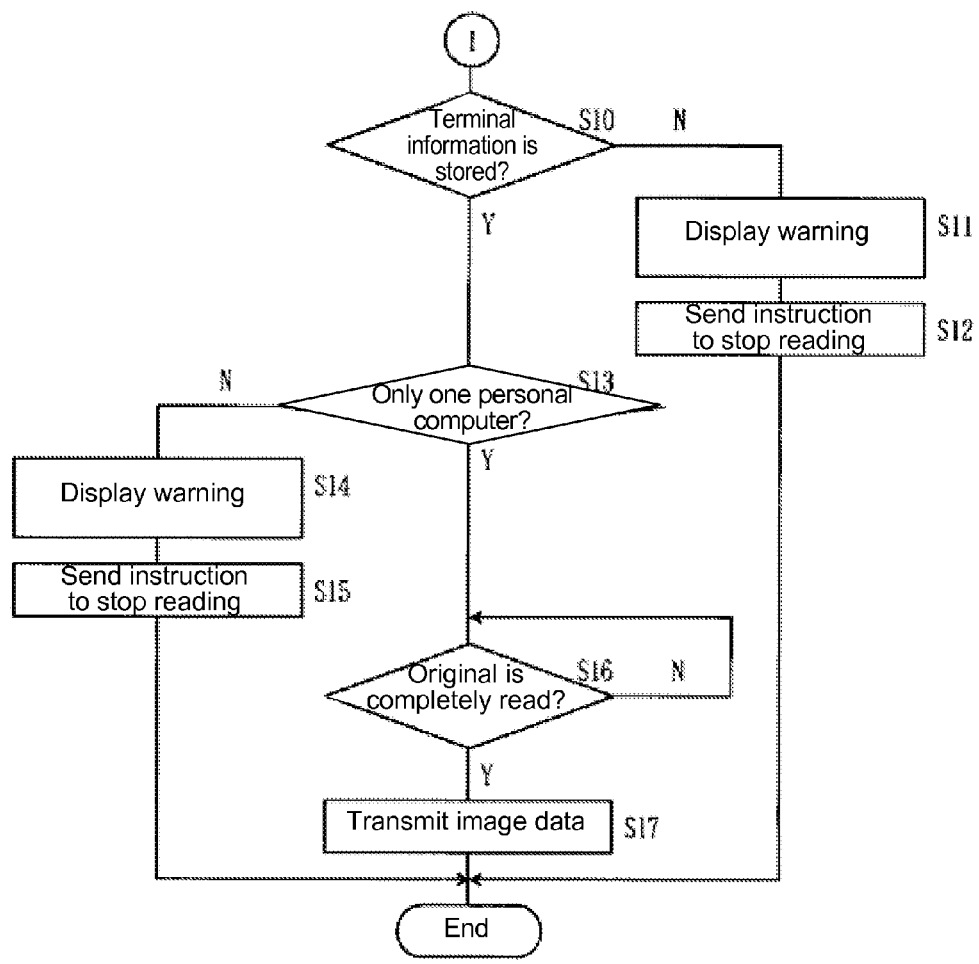
FIG. 3 is a flow chart No. 2 showing the operation of the multi function product according to the first embodiment of the present invention.

An operation of the network system with the configuration described above will be explained next. FIG. 2 is a flow chart No. 1 showing an operation of the multi function product 11 according to the first embodiment of the present invention. FIG. 3 is a flow chart No. 2 showing the operation of the multi function product according to the first embodiment of the present invention.

Figure 4:
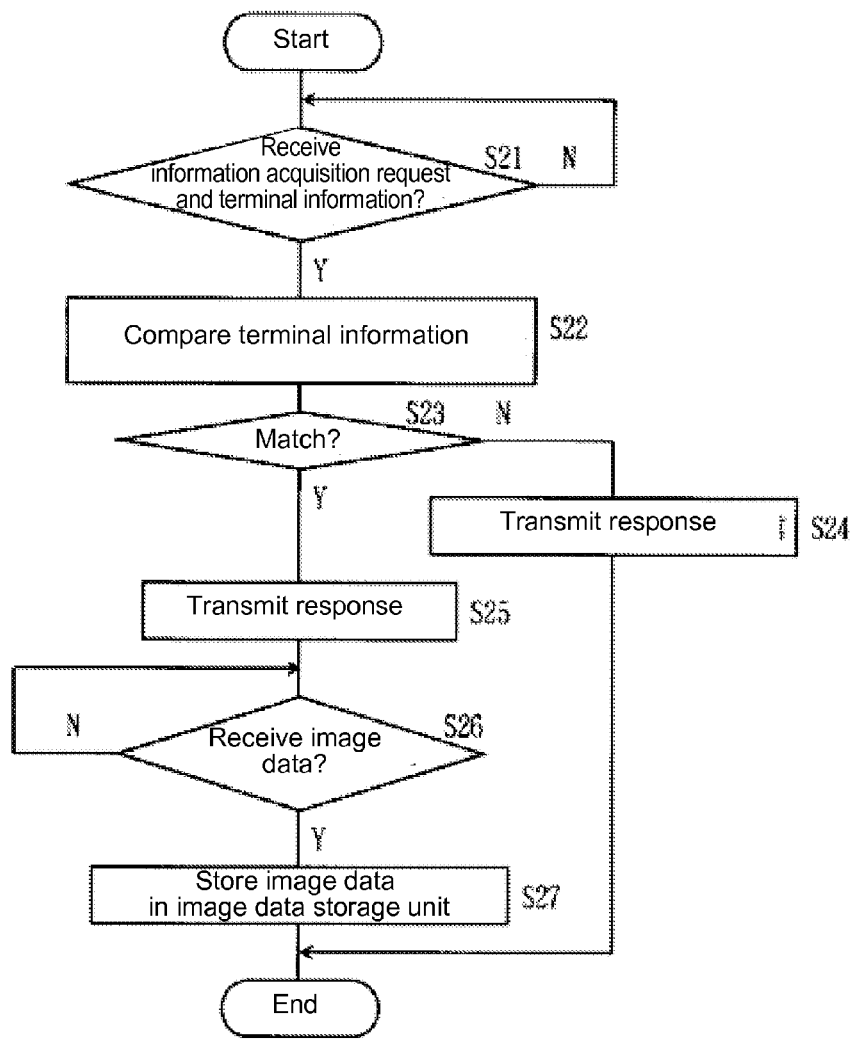
FIG. 4 is a flow chart showing an operation of a personal computer according to the first embodiment of the present invention.
Figure 5:
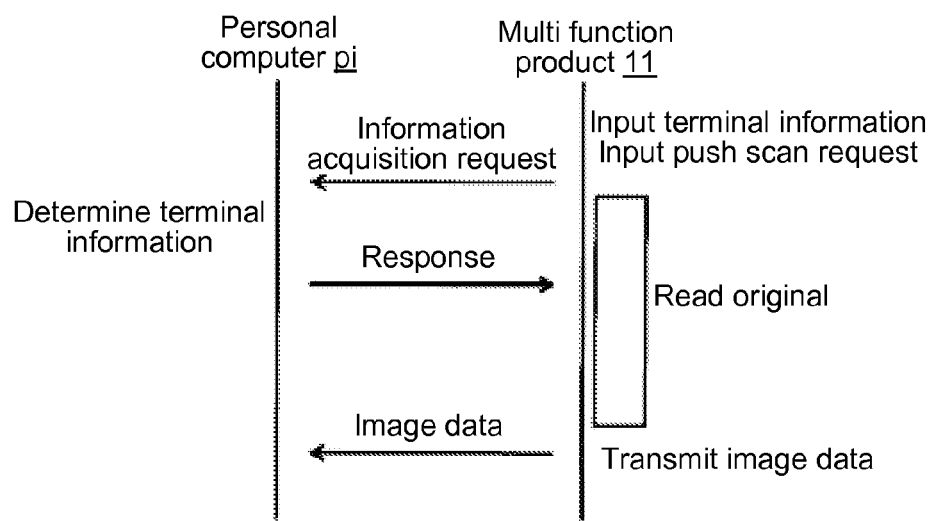
FIG. 5 is a schematic view showing an operation sequence of the network system according to the first embodiment of the present invention.

FIG. 4 is a flow chart showing an operation of the personal computer p1 according to the first embodiment of the present invention. FIG. 5 is a schematic view showing an operation sequence of the network system according to the first embodiment of the present invention. FIG. 6 is a schematic view showing the terminal information of the network system according to the first embodiment of the present invention.

FIG. 7 is a schematic view No. 1 showing an example of a response from the personal computer p1 according to the first embodiment of the present invention. FIG. 8 is a schematic view No. 2 showing another example of the response from the personal computer p1 according to the first embodiment of the present invention.

FIG. 9 is a schematic view No. 1 showing an example of detail information stored in the storage unit 17 of the multi function product 11 according to the first embodiment of the present invention. FIG. 10 is a schematic view No. 2 showing another example of the detail information stored in the storage unit 17 of the multi function product 11 according to the first embodiment of the present invention. FIG. 11 is a schematic view No. 3 showing a further example of the detail information stored in the storage unit 17 of the multi function product 11 according to the first embodiment of the present invention.

An operation of the multi function product 11 will be explained first. When an image of an original is transmitted to the personal computer p1 as a specific one of the personal computers p1, p2, and p3 from the multi function product 11 through the network 13, the operator places the original on an original placing stage (not shown) disposed on the multi function product 11. Then, the operator operates the operation unit 16 to input the terminal information of the personal computer p1 as the transmission destination to which the image is transmitted. Further, the operator touches a specific operation element of the operation unit 16 to input a push scan request for requesting the multi function product 11 to transmit read data as the image data acquired with the reading unit 20 to the personal computer p1. The read data and the image data constitute image information.

In the embodiment, the terminal information is set in advance for identifying each of the personal computers p1, p2, and p3. The terminal information is represented with specific characters of each of the personal computers p1, p2, and p3, and is formed of a text as shown in FIG. 6.

In the next step, a reading processing unit of the main control unit 15 performs a reading processing. When the terminal information and the push scan request are input, the reading control unit 21 scans the original to start reading the image of the original.

In the next step, an information request processing unit of the main control unit 15 performs an information request processing. Accordingly, the communication control unit 18 transmits an information acquisition request to each of the personal computers p1, p2, and p3 to request specific information through the concurrent notification and the terminal information input by the operator through the operation unit 16.

In the next step, the main control unit 15 starts a timer disposed therein to start measuring a period of time. Accordingly, for a specific period of time, the main control unit 15 waits for a response as answer information from each of the personal computers p1, p2, and p3 with respect to the information acquisition request.

When the main control unit 15 receives the response from each of the personal computers p1, p2, and p3, a terminal device determining processing unit of the main control unit 15 performs a terminal device determining processing, so that the terminal device determining unit 19 determines the contents of the response. In particular, the terminal device determining processing unit determines whether the response thus received is a response indicating that the terminal information is matched (the terminal information thus input is matched to the terminal information of the personal computer P1 among the personal computers p1, p2, and p3).

When the terminal device determining processing unit determines that the response received from the personal computer p1 among the personal computers p1, p2, and p3 is the response indicating that the terminal information is matched, the terminal device determining processing unit stores in the storage unit 17 the response indicating that the terminal information is matched and details of the terminal information transmitted from the personal computer p1 or detail information.

As shown in FIGS. 7 and 8, the detail information includes the terminal information of the personal computer p1, a host name, an IP address, and a terminal information matching determination result. The terminal information matching determination result represents a determination result whether the terminal information is matched. The IP address is an address composed of a plurality of numbers set for identifying each of the personal computers p1, p2, and p3. The host name is a name of a server (not shown) connected through the network 13.

When the terminal device determining processing unit determines that any of the responses received from the personal computers p1, p2, and p3 is not the response indicating that the terminal information is matched, the main control unit 15 completes the process.

In the next step, when the timer becomes timeout to stop measuring a period of time, the terminal device determination processing unit determines whether the terminal information is stored in the storage unit 17.

As shown in FIG. 9, when the terminal device determination processing unit determines that the terminal information is not stored in the storage unit 17 (not registered), the terminal device determination processing unit displays a warning on the display unit of the operation unit 16 indicating that there is no personal computer with matched terminal information. Then, the terminal device determination processing unit sends an instruction to the reading control unit 21 to stop reading the image of the original (reading termination), thereby completing the process.

When the terminal device determination processing unit determines that the terminal information is stored in the storage unit 17, the terminal device determination processing unit determines whether only one personal computer has the matched terminal information.

As shown in FIG. 10, when the terminal device determination processing unit determines that only one personal computer has the matched terminal information, the one personal computer is registered as the specific personal computer having the terminal information thus matched.

In the next step, an image information transmission processing unit of the main control unit 15 performs an image information transmission processing to determine whether the image of the original is completely read. When the image information transmission processing unit determines that the image of the original is completely read, the personal computer p1 is connected to the multi function product 11 according to the IP address. Accordingly, read data of the image thus read are transmitted to the personal computer p1 as the image data, thereby completing the process.

As shown in FIG. 11, when the terminal device determination processing unit determines that a plurality of the personal computers has the matched terminal information, the main control unit 15 displays a warning on the display unit of the operation unit 16 indicating that a plurality of the personal computers has the matched terminal information. Further, the main control unit 15 sends an instruction to the reading control unit 21 to stop reading the image of the original (reading termination), thereby completing the process.

An operation of the personal computer p1 will be explained next. First, a terminal information matching determination processing unit of the main control unit 25 performs a terminal information matching determination processing. In particular, when the transmission reception unit 28 receives the information acquisition request and the terminal information from the multi function product 11, the determining unit 29 compares the terminal information transmitted from the multi function product 11 with the terminal information stored in the terminal information storage unit 27. Accordingly, the determining unit 29 determines whether the terminal information transmitted from the multi function product 11 matches to the terminal information stored in the terminal information storage unit 27.

When the determining unit 29 determines that the terminal information transmitted from the multi function product 11 matches to the terminal information stored in the terminal information storage unit 27, an answer information transmission processing unit of the main control unit 25 performs an answer information transmission processing. Accordingly, the answer information transmission processing unit sends a determination result of the terminal information matching determination processing unit as answer information to the multi function product 11.

More specifically, when the determining unit 29 determines that the terminal information transmitted from the multi function product 11 matches to the terminal information stored in the terminal information storage unit 27, the answer information transmission processing unit controls the transmission reception unit 28 to transmit a response indicating that the terminal information matches and the detail information of the personal computer p1 to the multi function product 11.

When the determining unit 29 determines that the terminal information transmitted from the multi function product 11 does not match to the terminal information stored in the terminal information storage unit 27, the answer information transmission processing unit controls the transmission reception unit 28 to transmit a response indicating that the terminal information does not match to the multi function product 11, thereby completing the process.

When the answer information transmission processing unit controls the transmission reception unit 28 to transmit the response indicating that the terminal information matches to the multi function product 11, the multi function product 11 transmits the image data to the personal computer p1. Accordingly, an image information reception processing unit of the main control unit 25 performs an image information reception processing. More specifically, the transmission reception unit 28 receives the image data. After the transmission reception unit 28 receives the image data, the image data thus received are stored in the image data storage unit 30, thereby completing the process.

As described above, in the embodiment, when the operator simply inputs the terminal information in the multi function product 11, it is possible to automatically transmit the image data to the personal computer with the unregistered terminal information. Accordingly, it is possible to improve operability of the multi function product 11. Further, it is possible to prevent the image data from inadvertently being transmitted to personal computers other than the personal computer p1 as the transmission destination.

The flow charts shown in FIGS. 2 and 3 will be explained next. In step S1, the terminal information of the personal computer p1 is input. In step S2, the push scan request is input. In step S3, the reading control unit 21 scans the original to start reading the image of the original. In step S4, the communication control unit 18 transmits the information acquisition request and the terminal information.

In step S5, the main control unit 15 starts the timer. In step S6, it is determined whether the timer becomes timeout. When it is determined that the timer becomes timeout, the process proceeds to step S10. When it is determined that the timer does not become timeout, the process proceeds to step S7.

In step S7, it is determined whether the response is received from one of the personal computers p1, p2, and p3. When it is determined that the response is received from one of the personal computers p1, p2, and p3, the process proceeds to step S8. When it is determined that the response is not received from one of the personal computers p1, p2, and p3, the process returns to step S6.

In step S8, it is determined whether the response thus received is the response indicating that the terminal information is matched. When it is determined that the response thus received is the response indicating that the terminal information is matched, the process proceeds to step S9. When it is determined that the response thus received is not the response indicating that the terminal information is not matched, the process returns to step S6.

In step S9, the terminal information of the personal computer p1 is stored in the storage unit 17, and the process returns to step S6. In step S10, it is determined whether the terminal information of one of the personal computers p1, p2, and p3 is stored in the storage unit 17. When it is determined that the terminal information of one of the personal computers p1, p2, and p3 is stored in the storage unit 17, the process proceeds to step S13. When it is determined that the terminal information of one of the personal computers p1, p2, and p3 is not stored in the storage unit 17, the process proceeds to step S11.

In step S11, the warning is displayed on the display unit of the operation unit 16 indicating that there are not the personal computers p1, p2, and p3. In step S12, the instruction is sent to the reading control unit 21 to stop reading the image of the original, thereby completing the process.

In step S13, it is determined whether there is only one personal computer. When it is determined that there is only one personal computer, the process proceeds to step S16. When it is determined that there is a plurality of the personal computers, the process proceeds to step S14. In step S14, the warning is displayed on the display unit of the operation unit 16 indicating that there is a plurality of the personal computers. In step S15, the instruction is sent to the reading control unit 21 to stop reading the image of the original, thereby completing the process. In step S16, the multi function product 11 waits until the image of the original is completely read. In step S17, the image data are transmitted to the personal computer p1, thereby completing the process.

The flow chart shown in FIG. 4 will be explained next. In step S21, the transmission reception unit 28 waits until the transmission reception unit 28 receives the information acquisition request and the terminal information from the multi function product 11. In step S22, the determining unit 29 compares the terminal information transmitted from the multi function product 11 with the terminal information stored in the terminal information storage unit 27.

In step S23, the determining unit 29 determines whether the terminal information transmitted from the multi function product 11 matches to the terminal information stored in the terminal information storage unit 27. When the determining unit 29 determines that the terminal information transmitted from the multi function product 11 matches to the terminal information stored in the terminal information storage unit 27, the process proceeds to step S25. When the determining unit 29 determines that the terminal information transmitted from the multi function product 11 does not match to the terminal information stored in the terminal information storage unit 27, the process proceeds to step S24.

In step S24, the transmission reception unit 28 transmits the response to the multi function product 11 indicating that the terminal information does not match, thereby completing the process. In step S25, the transmission reception unit 28 transmits the response to the multi function product 11 indicating that the terminal information does match. In step S26, the transmission reception unit 28 waits until the transmission reception unit 28 receives the image data. In step S27, the image data are stored in the image data storage unit 30, thereby completing the process.

Second Embodiment

A second embodiment of the present invention will be explained next. Components in the second embodiment similar to those in the first embodiment are designated with the same reference numerals, and explanations thereof are omitted. The components in the second embodiment similar to those in the first embodiment provide effects similar to those in the first embodiment.

In the first embodiment, each of the personal computers p1, p2, and p3 determines whether the terminal information transmitted from the multi function product 11 matches to the terminal information of the personal computer p1. In the second embodiment, in the multi function product 11, the operator operates the operation unit 16, so that it is possible to determine whether the terminal information thus input matches the terminal information transmitted from each of the personal computers p1, p2, and p3.

Figure 12:
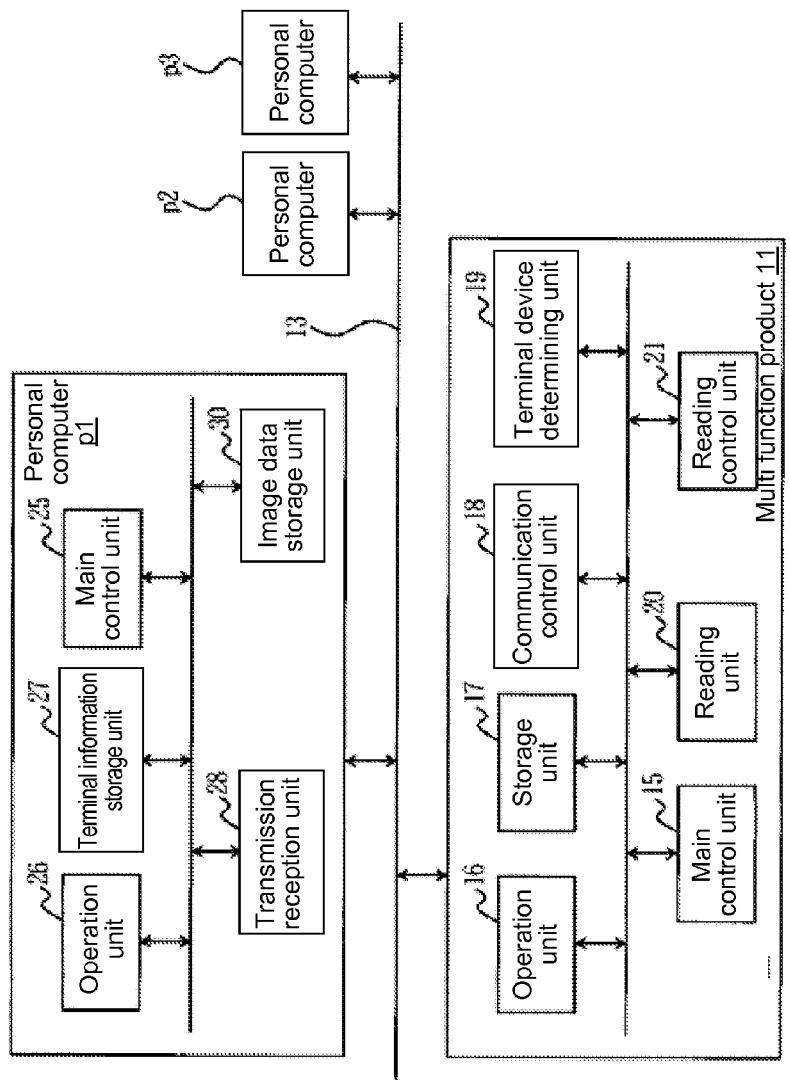
FIG. 12 is a block diagram showing a network system according to a second embodiment of the present invention.

FIG. 12 is a block diagram showing a network system according to the second embodiment of the present invention. In this case, the terminal information matching determination processing unit of the main control unit 25 controls the terminal device determining unit 19 to determine whether the terminal information thus input through the operation unit 16 by the operator matches the terminal information transmitted from each of the personal computers p1, p2, and p3.

Figure 13:
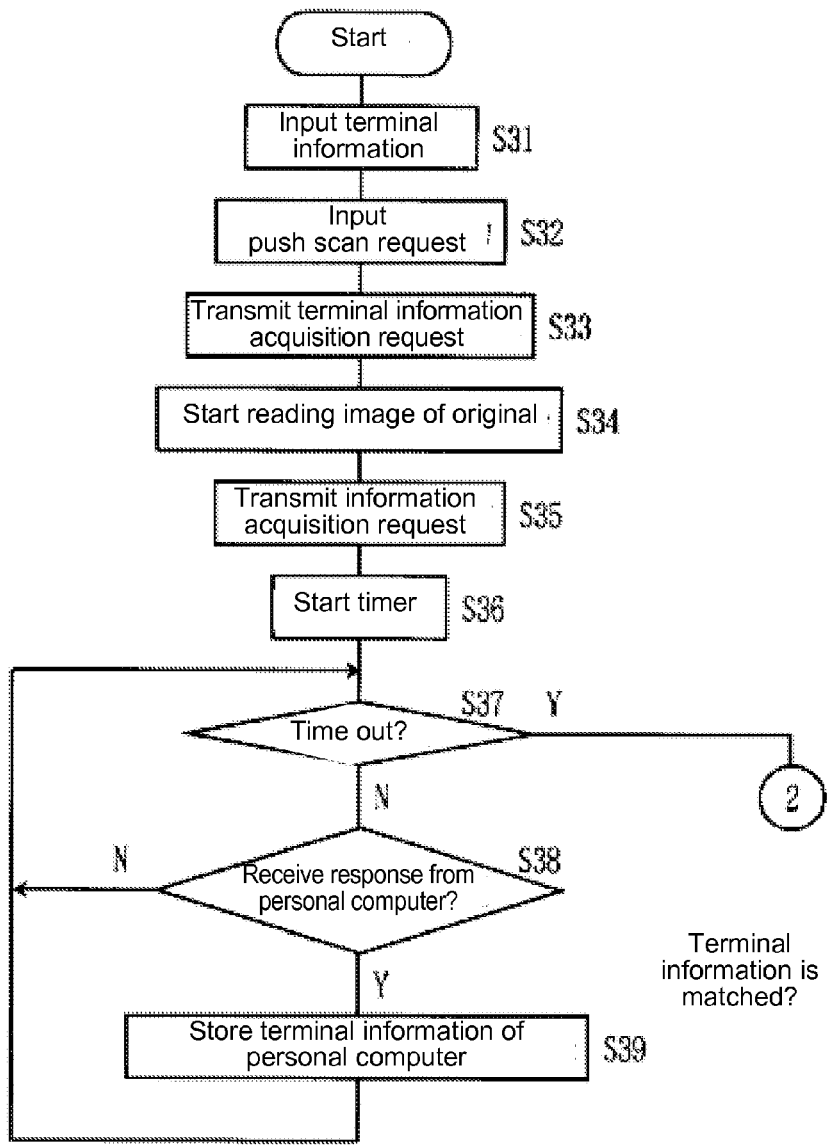
FIG. 13 is a flow chart No. 1 showing an operation of a multi function product according to the second embodiment of the present invention.
Figure 14:
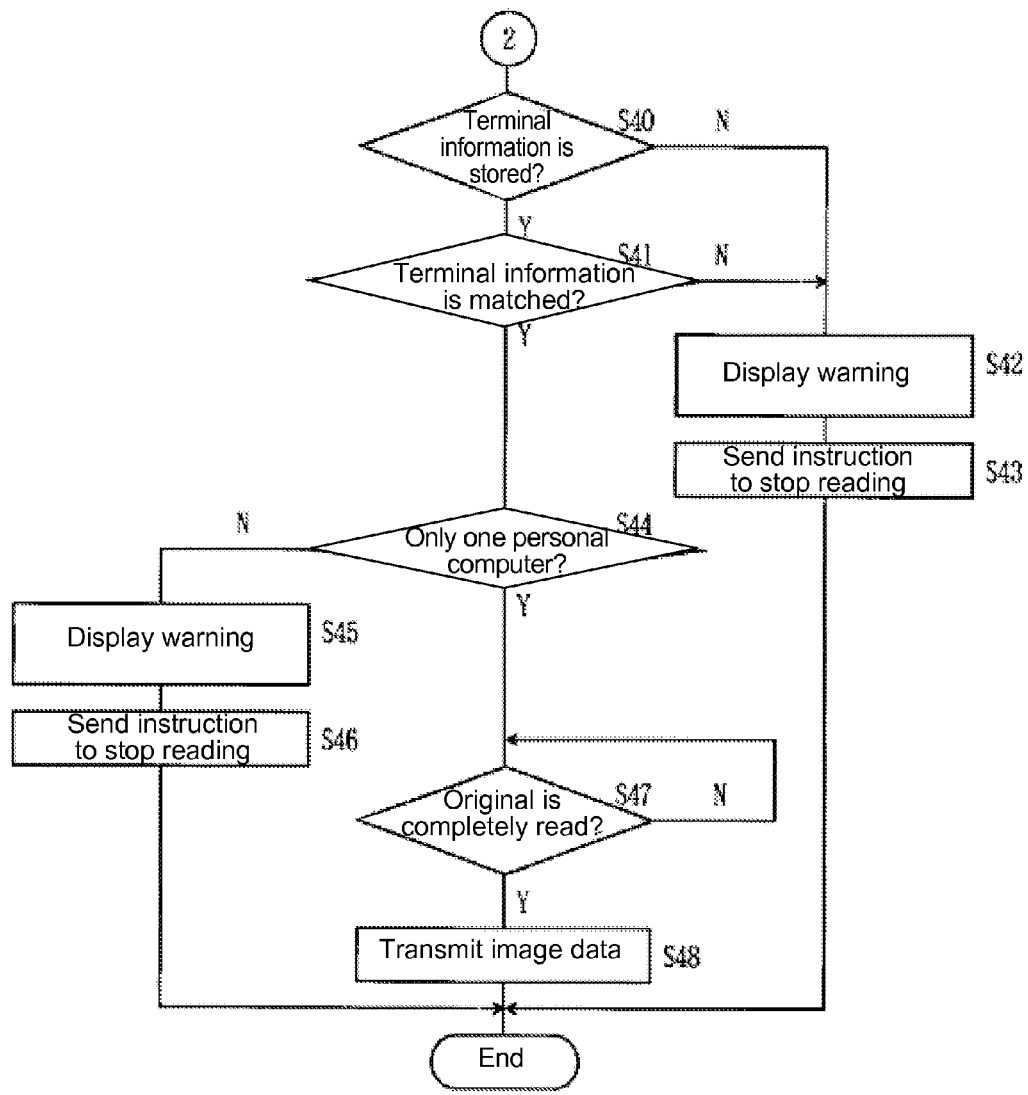
FIG. 14 is a flow chart No. 2 showing the operation of the multi function product according to the second embodiment of the present invention.

An operation of the network system with the configuration described above will be explained next. FIG. 13 is a flow chart No. 1 showing an operation of the multi function product 11 according to the second embodiment of the present invention. FIG. 14 is a flow chart No. 2 showing the operation of the multi function product 11 according to the second embodiment of the present invention.

Figure 15:
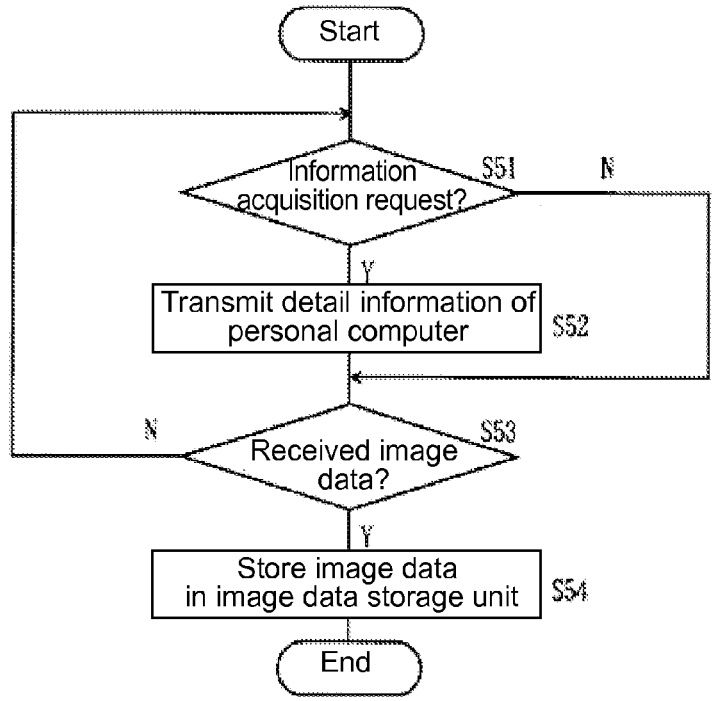
FIG. 15 is a flow chart showing an operation of a personal computer according to the second embodiment of the present invention.
Figure 16:
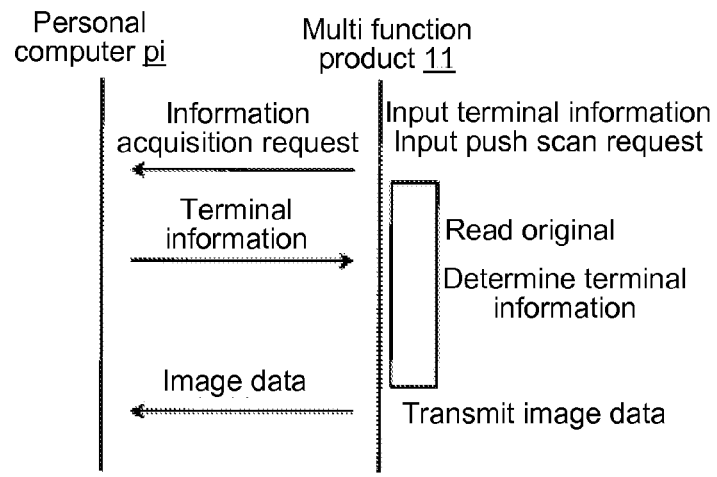
FIG. 16 is a schematic view showing an operation sequence of the network system according to the second embodiment of the present invention.

FIG. 15 is a flow chart showing an operation of the personal computer p1 according to the second embodiment of the present invention. FIG. 16 is a schematic view showing an operation sequence of the network system according to the second embodiment of the present invention.

FIG. 17 is a schematic view showing an example of a response from the personal computer p1 according to the second embodiment of the present invention. FIG. 18 is a schematic view showing an example of detail information stored in the storage unit 17 of the multi function product 11 according to the second embodiment of the present invention.

An operation of the multi function product 11 will be explained first. When the image of the original is transmitted to the personal computer p1 as a specific one of the personal computers p1, p2, and p3 from the multi function product 11 through the network 13, the operator places the original on the original placing stage (not shown) disposed on the multi function product 11. Then, the operator operates the operation unit 16 to input the terminal information of the personal computer p1 as the transmission destination to which the image is transmitted. Further, the operator touches a specific operation element of the operation unit 16 to input the push scan request for requesting the multi function product 11 to transmit the read data as the image data acquired with the multi function product 11 to the personal computer p1. The read data and the image data constitute the image information.

In the next step, the reading processing unit of the main control unit 15 performs the reading processing. When the terminal information and the push scan request are input, the reading control unit 21 scans the original to start reading the image of the original. In the next step, the information request processing unit of the main control unit 15 performs the information request processing. Accordingly, the communication control unit 18 transmits the information acquisition request to each of the personal computers p1, p2, and p3 through the concurrent notification.

In the next step, the main control unit 15 starts the timer disposed therein to start measuring a period of time. Accordingly, for a specific period of time, the main control unit 15 waits for the response as the answer information from each of the personal computers p1, p2, and p3 with respect to the information acquisition request. When the main control unit 15 receives the response from each of the personal computers p1, p2, and p3, the terminal device determining processing unit stores the detail information of the personal computers p1, p2, and p3 in the storage unit 17.

As shown in FIG. 17, the detail information includes the terminal information of the personal computer p1, the host name, the IP address, and the like.

In the next step, when the timer becomes timeout to stop measuring a period of time, the terminal device determination processing unit determines whether the terminal information is stored in the storage unit 17.

When the terminal device determination processing unit determines that the terminal information is not stored in the storage unit 17, the terminal device determination processing unit displays the warning on the display unit of the operation unit 16 indicating that there is no personal computer with the matched terminal information. Then, the terminal device determination processing unit sends the instruction to the reading control unit 21 to stop reading the image of the original (reading termination), thereby completing the process.

When the terminal device determination processing unit determines that the terminal information is stored in the storage unit 17, the terminal device determination processing unit controls the terminal device determining unit 19 to determine whether the terminal information of the personal computer p1 matches to the terminal information stored in the storage unit 17.

When the terminal device determining unit 19 determines that the terminal information of the personal computer p1 matches to the terminal information stored in the storage unit 17, the terminal device determination processing unit determines whether only one personal computer has the matched terminal information. When the terminal device determination processing unit determines that only one personal computer has the matched terminal information, the terminal device determination processing unit determines that the personal computer is the personal computer with the input terminal information.

In the next step, the image information transmission processing unit of the main control unit 15 determines whether the image of the original is completely read. When the image information transmission processing unit determines that the image of the original is completely read, the personal computer p1 is connected to the multi function product 11 according to the IP address. Accordingly, the read data of the image thus read are transmitted to the personal computer p1 as the image data, thereby completing the process.

As shown in FIG. 18, when the terminal device determination processing unit determines that a plurality of the personal computers has the matched terminal information, the main control unit 15 displays the warning on the display unit of the operation unit 16 indicating that a plurality of the personal computers has the matched terminal information. Further, the main control unit 15 sends the instruction to the reading control unit 21 to stop reading the image of the original (reading termination), thereby completing the process.

An operation of the personal computer p1 will be explained next. First, when the transmission reception unit 28 receives the information acquisition request from the multi function product 11, the answer information transmission processing unit of the main control unit 25 sends the detail information to the multi function product 11.

When the multi function product 11 transmits the image data to the personal computer p1, the image information reception processing unit of the main control unit 25 performs the image information reception processing, so that the transmission reception unit 28 receives the image data. After the transmission reception unit 28 receives the image data, the image data thus received are stored in the image data storage unit 30, thereby completing the process.

As described above, in the embodiment, the multi function product 11 is configured to determine whether the terminal information matches to the terminal information transmitted from each of the personal computers p1, p2, and p3. Accordingly, it is possible to eliminate the determining unit 29 in each of the personal computers p1, p2, and p3. As a result, it is possible to reduce work load applied to each of the personal computers p1, p2, and p3.

The flow charts shown in FIGS. 13 and 14 will be explained next. In step S31, the terminal information of the personal computer p1 is input. In step S32, the push scan request is input. In step S33, the communication control unit 18 transmits the terminal information acquisition request. In step S34, the reading control unit 21 scans the original to start reading the image of the original. In step S35, the communication control unit 18 transmits the information acquisition request.

In step S36, the main control unit 15 starts the timer. In step S37, it is determined whether the timer becomes timeout. When it is determined that the timer becomes timeout, the process proceeds to step S40. When it is determined that the timer does not become timeout, the process proceeds to step S38.

In step S38, it is determined whether the response is received from one of the personal computers p1, p2, and p3. When it is determined that the response is received from one of the personal computers p1, p2, and p3, the process proceeds to step S39. When it is determined that the response is not received from one of the personal computers p1, p2, and p3, the process returns to step S37.

In step S39, the terminal information of the personal computer p1 is stored in the storage unit 17, and the process returns to step S37. In step S40, it is determined whether the terminal information of the personal computer p1 is stored in the storage unit 17. When it is determined that the terminal information of the personal computer p1 is stored in the storage unit 17, the process proceeds to step S41. When it is determined that the terminal information of the personal computer p1 is not stored in the storage unit 17, the process proceeds to step S42.

In step S41, it is determined whether the terminal information is matched. When it is determined that the terminal information is matched, the process proceeds to step S44. When it is determined that the terminal information is not matched, the process proceeds to step S42.

In step S42, the warning is displayed on the display unit of the operation unit 16 indicating that there is not the personal computer p1. In step S43, the instruction is sent to the reading control unit 21 to stop reading the image of the original, thereby completing the process.

In step S44, it is determined whether there is only one personal computer. When it is determined that there is only one personal computer, the process proceeds to step S47. When it is determined that there is a plurality of the personal computers, the process proceeds to step S45. In step S45, the warning is displayed on the display unit of the operation unit 16 indicating that there is a plurality of the personal computers. In step S46, the instruction is sent to the reading control unit 21 to stop reading the image of the original, thereby completing the process. In step S47, the multi function product 11 waits until the image of the original is completely read. In step S48, the image data are transmitted to the personal computer p1, thereby completing the process.

The flow chart shown in FIG. 15 will be explained next. In step S51, it is determined whether there is the information acquisition request. When it is determined that there is the information acquisition request, the process proceeds to step S52. When it is determined that there is not the information acquisition request, the process proceeds to step S53.

In step S52, it is determined whether the terminal information of the personal computer p1 is transmitted to the multi function product 11. In step S53, it is determined whether the image data are received. When it is determined that the image data are received, the process proceeds to step S54. When it is determined that the image data are not received, the process returns to step S51. In step S54, the image data are stored in the image data storage unit 30, thereby completing the process.

Third Embodiment

A third embodiment of the present invention will be explained next. Components in the third embodiment similar to those in the first and second embodiments are designated with the same reference numerals, and explanations thereof are omitted. The components in the third embodiment similar to those in the first and second embodiments provide effects similar to those in the first and second embodiments.

Figure 19:
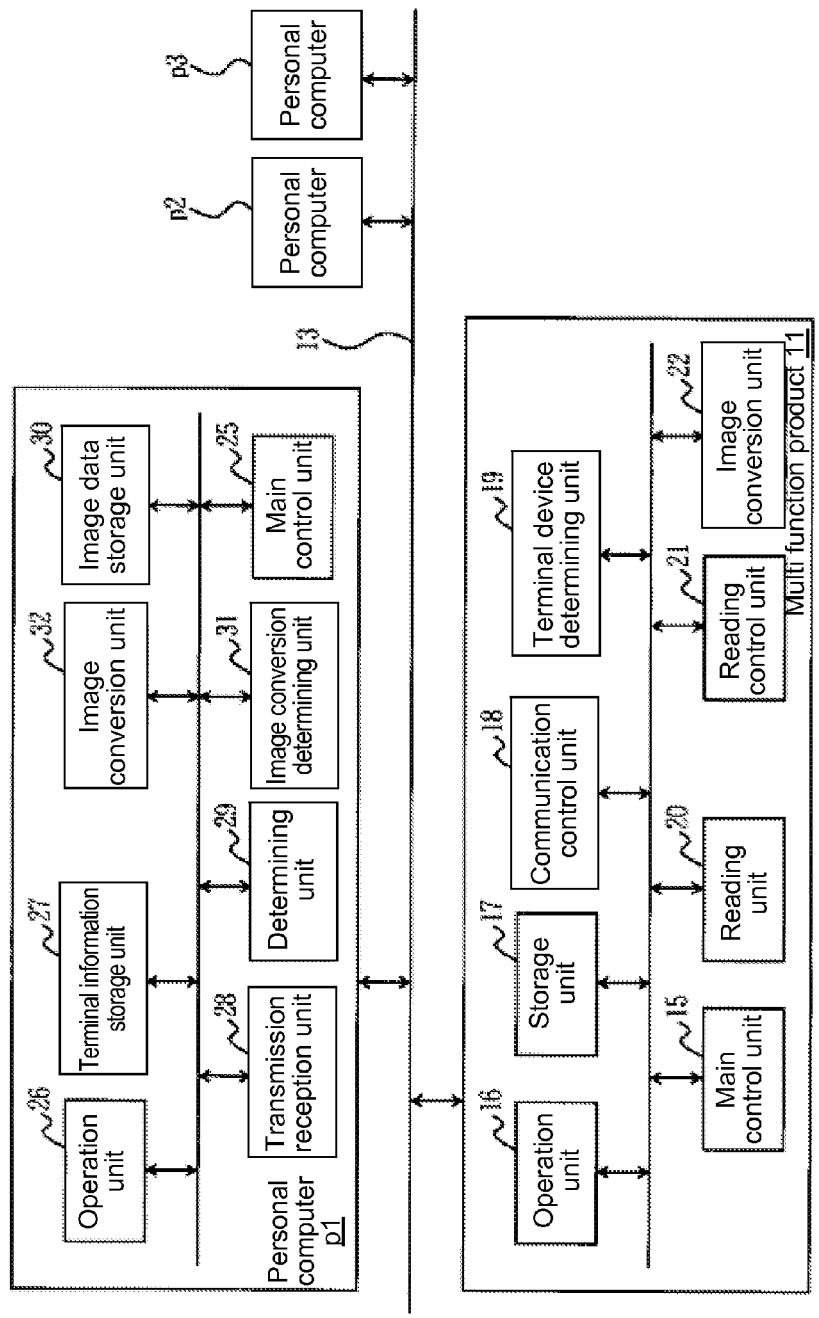
FIG. 19 is a block diagram showing a network system according to a third embodiment of the present invention.

FIG. 19 is a block diagram showing a network system according to the third embodiment of the present invention.

As shown in FIG. 19, the multi function product 11 includes the operation unit 16 for inputting terminal information of one of the personal computers p1, p2, and p3 as a specific personal computer, and for specifying an image format requested by the operator; the storage unit 17 for storing the terminal information and the image format; and an image conversion unit 22.

In the embodiment, the image conversion unit 22 is provided for determining whether it is possible to convert the read data to the image data with the image format thus specified in the multi function product 11 or the personal computer p1 before the image data are transmitted to the personal computer p1. More specifically, the image conversion unit 22 is provided for determining whether the image format thus specified is supported, and it is possible to perform an image conversion of the read data to the image data with the image format thus specified. Further, the image conversion unit 22 is provided for performing the image conversion according to a determination result, thereby forming the image data with the image format thus specified.

In the embodiment, the personal computer p1 includes the operation unit 26 for inputting the terminal information of the personal computer p1 and the image format thus supported in advance; the terminal information storage unit 27 for storing the terminal information and the image format input through the operation unit 26; the transmission reception unit 28 for receiving the terminal information and the image format transmitted from the multi function product 11; the determining unit 29 for comparing the terminal information received through the transmission reception unit 28 with the terminal information stored in the terminal information storage unit 27; an image conversion determining unit 31 for determining whether it is possible to perform the image conversion to the image format thus specified according to the image format thus received; and an image conversion unit 32 for performing the image conversion on the read data transmitted from the multi function product 11 according to the instruction transmitted from the multi function product 11.

Figure 20:
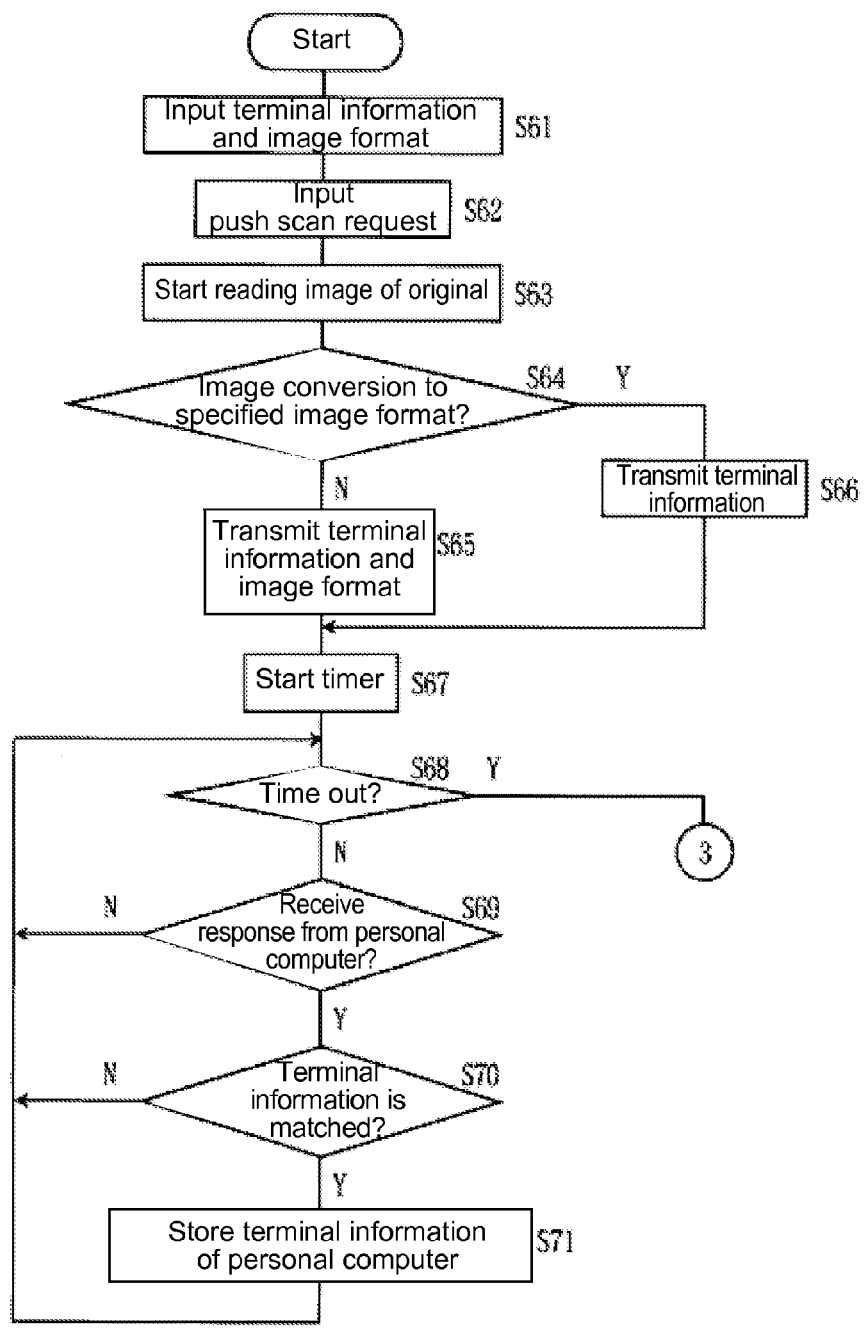
FIG. 20 is a flow chart No. 1 showing an operation of a multi function product according to the third embodiment of the present invention.
Figure 21:
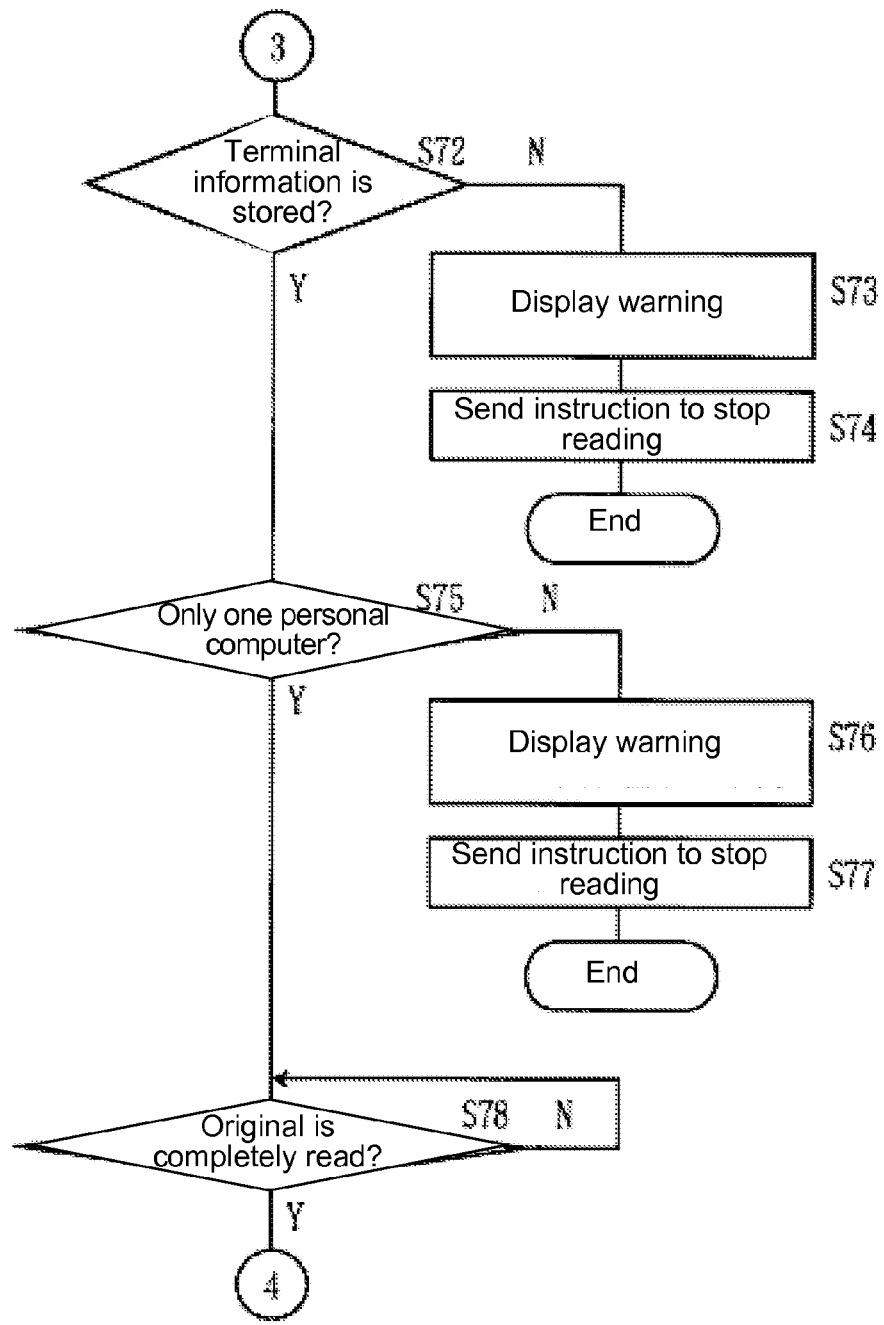
FIG. 21 is a flow chart No. 2 showing the operation of the multi function product according to the third embodiment of the present invention.
Figure 22:
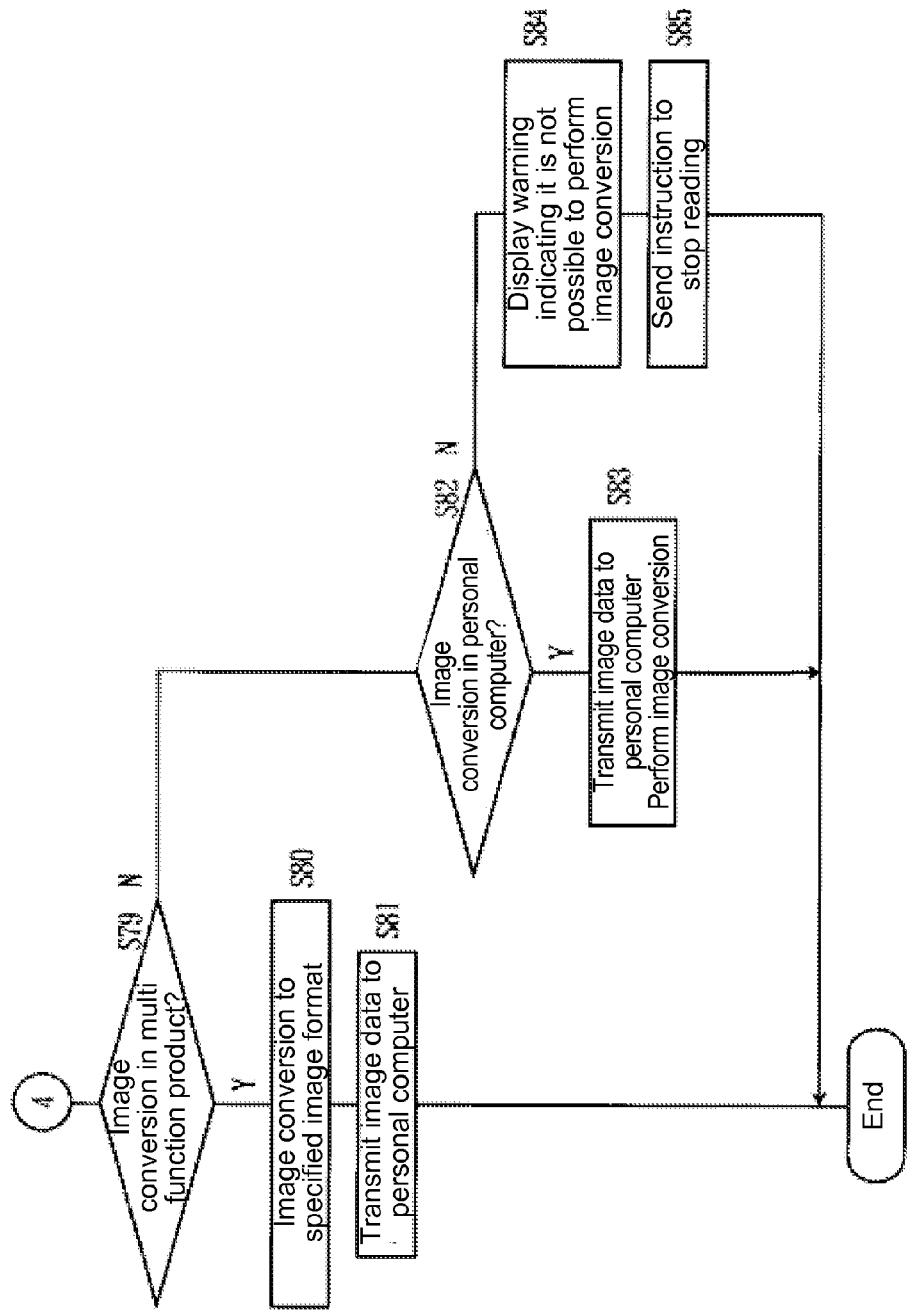
FIG. 22 is a flow chart No. 3 showing the operation of the multi function product according to the third embodiment of the present invention.

An operation of the network system with the configuration described above will be explained next. FIG. 20 is a flow chart No. 1 showing an operation of the multi function product 11 according to the third embodiment of the present invention. FIG. 21 is a flow chart No. 2 showing the operation of the multi function product 11 according to the third embodiment of the present invention. FIG. 22 is a flow chart No. 3 showing the operation of the multi function product 11 according to the third embodiment of the present invention.

Figure 23:
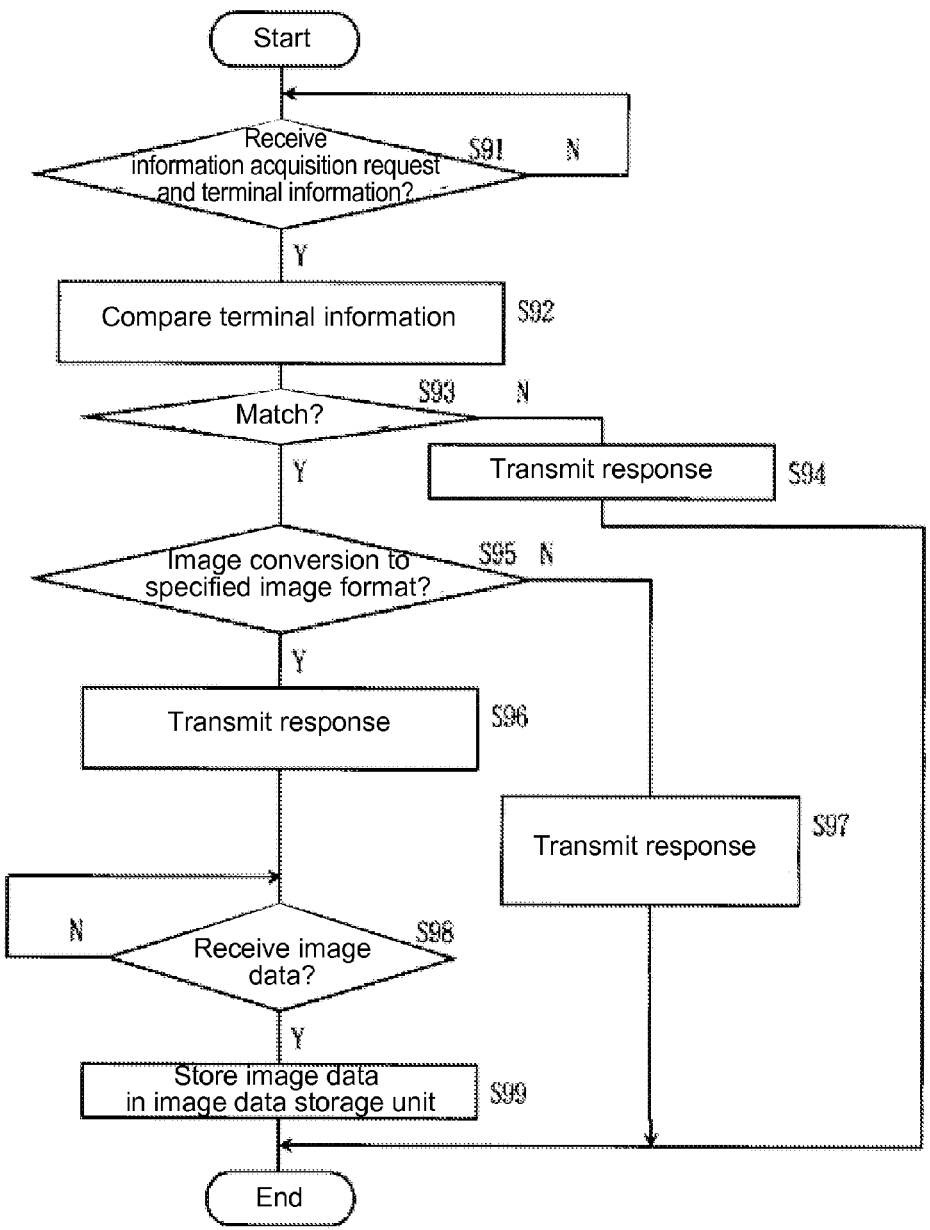
FIG. 23 is a flow chart showing an operation of a personal computer according to the third embodiment of the present invention.
Figure 24:
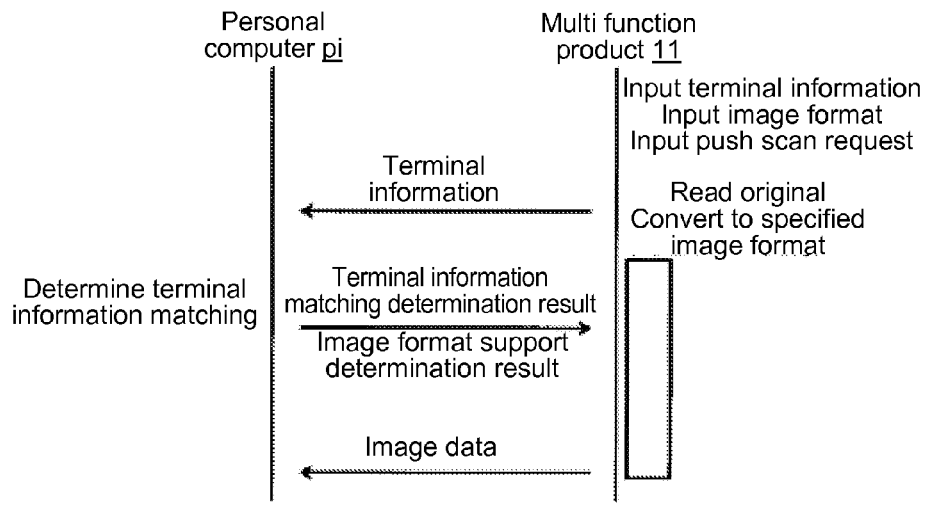
FIG. 24 is a schematic view No. 1 showing an operation sequence of the network system according to the third embodiment of the present invention.
Figure 25:
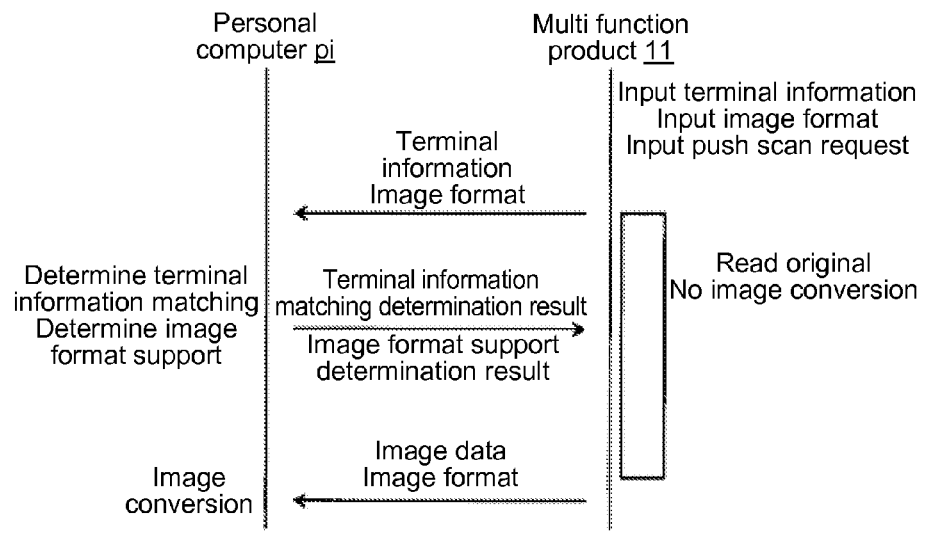
FIG. 25 is a schematic view No. 2 showing the operation sequence of the network system according to the third embodiment of the present invention.

FIG. 23 is a flow chart showing an operation of the personal computer p1 according to the third embodiment of the present invention. FIG. 24 is a schematic view No. 1 showing an operation sequence of the network system according to the third embodiment of the present invention. FIG. 25 is a schematic view No. 2 showing the operation sequence of the network system according to the third embodiment of the present invention.

FIG. 26 is a schematic view showing an example of the image format of the multi function product 11 according to the third embodiment of the present invention. FIG. 27 is a schematic view showing an example of a support image format table of the multi function product 11 according to the third embodiment of the present invention.

FIG. 28 is a schematic view showing an example of a response from the personal computer p1 according to the third embodiment of the present invention. FIG. 29 is a schematic view No. 1 showing an example of detail information stored in the storage unit 17 of the multi function product 11 according to the third embodiment of the present invention. FIG. 30 is a schematic view No. 2 showing another example of the detail information stored in the storage unit 17 of the multi function product 11 according to the third embodiment of the present invention.

An operation of the multi function product 11 will be explained first. When the image of the original is transmitted to the personal computer p1 as a specific one of the personal computers p1, p2, and p3 from the multi function product 11 through the network 13, the operator places the original on the original placing stage (not shown) disposed on the multi function product 11. Then, the operator operates the operation unit 16 to input the terminal information of the personal computer p1 as the transmission destination to which the image is transmitted, and input and specify the image format.

Further, the operator touches a specific operation element of the operation unit 16 to input the push scan request for requesting the multi function product 11 to transmit the read data as the image data acquired with the multi function product 11 to the personal computer p1. The read data and the image data constitute the image information.

In the embodiment, the terminal information is set in advance for identifying one of the personal computers p1, p2, and p3. The terminal information is represented with specific characters of each of the personal computers p1, p2, and p3, and is formed of a text as shown in FIG. 26. The image format is a format for performing the image conversion on the read data of the image read with the reading unit 20 to the specific image data in the multi function product 11. The operator operates the multi function product 11 to input and specify the specific image format.

In the next step, the reading processing unit of the main control unit 15 performs the reading processing. When the terminal information and the push scan request are input, the reading control unit 21 scans the original to start reading the image of the original. In the next step, an image conversion processing unit of the main control unit 15 performs an image conversion processing. Accordingly, it is determined whether it is possible to perform the image conversion to the image format thus specified with the image conversion unit 22.

In the embodiment, the image conversion unit 22 includes the support image format table as an image format information table shown in FIG. 27. The image conversion processing unit refers to the support image format table, and determines whether the image format specified by the operation is stored in the support image format table. When the image conversion processing unit determines that the image format thus specified is stored in the support image format table, the image conversion processing unit determines that it is possible to perform the image conversion to the image format thus specified.

In the next step, when the image conversion processing unit determines that it is possible to perform the image conversion to the image format thus specified, the information request processing unit of the main control unit 15 performs the information request processing. Accordingly, as shown FIG. 24, the communication control unit 18 transmits the terminal information and the information acquisition request to each of the personal computers p1, p2, and p3 through the concurrent notification.

When the image conversion processing unit determines that it is not possible to perform the image conversion to the image format thus specified, as shown in FIG. 25, the main control unit 15 transmits the terminal information, the information acquisition request and the image format thus specified to each of the personal computers p1, p2, and p3, so that the main control unit 15 determines whether each of the personal computers p1, p2, and p3 supports the image format (whether it is possible to perform the image conversion to the image format thus specified).

In the next step, the main control unit 15 starts the timer disposed therein to start measuring a period of time. Accordingly, for a specific period of time, the main control unit 15 waits for the response as the answer information from each of the personal computers p1, p2, and p3 with respect to the information acquisition request. When the main control unit 15 receives the response from each of the personal computers p1, p2, and p3, the terminal device determining processing unit of the main control unit 15 performs the terminal device determining processing, so that the terminal device determining unit 19 determines the contents of the response. In particular, the terminal device determining processing unit determines whether the response thus received is the response indicating that the terminal information is matched (the terminal information thus input is matched to the terminal information of the personal computer P1 among the personal computers p1, p2, and p3).

When the terminal device determining processing unit determines that the response received from the personal computer p1 among the personal computers p1, p2, and p3 is the response indicating that the terminal information is matched, the terminal device determining processing unit stores in the storage unit 17 the response indicating that the terminal information is matched and the detail information of the terminal information transmitted from the personal computer p1. The detail information includes the terminal information of the personal computer p1, the host name, the IP address, and the terminal information matching determination result.

In the embodiment, when the communication control unit 18 transmits the terminal information and the image format thus specified as well as the information acquisition request to the personal computer p1 through the concurrent notification, as shown in FIGS. 28 and 29, the detail information includes the terminal information of the personal computer p1, the host name, the IP address, the terminal information matching determination result, an image format support determination result, the image format supported on the personal computer p1, and the like. The image format support determination result represents a determination result whether the personal computer p1 supports the image format.

When the terminal device determining processing unit determines that any of the responses received from the personal computers p1, p2, and p3 is not the response indicating that the terminal information is matched, the main control unit 15 completes the process.

In the next step, when the timer becomes timeout to stop measuring a period of time, the terminal device determination processing unit determines whether the terminal information is stored in the storage unit 17.

When the terminal device determination processing unit determines that the terminal information is not stored in the storage unit 17, the terminal device determination processing unit displays the warning on the display unit of the operation unit 16 indicating that there is no personal computer with the matched terminal information. Then, the terminal device determination processing unit sends the instruction to the reading control unit 21 to stop reading the image of the original (reading termination), thereby completing the process.

When the terminal device determination processing unit determines that the terminal information is stored in the storage unit 17, the terminal device determination processing unit determines whether only one personal computer has the matched terminal information. As shown in FIGS. 28 and 29, when the terminal device determination processing unit determines that only one personal computer p1 has the matched terminal information, the terminal device determination processing unit determines that the personal computer p1 is the personal computer with the input terminal information.

In the next step, the image conversion processing unit determines whether the image of the original is completely read. When the image conversion processing unit determines that the image of the original is completely read, the multi function product 11 determines whether it is possible to perform the image conversion to the image format thus specified.

In the next step, when the multi function product 11 determines that it is possible to perform the image conversion to the image format thus specified, the image conversion processing unit controls the image conversion unit 22 to perform the image conversion on the read data to the image data with the image format thus specified. Then, the image information transmission processing unit connects the personal computer p1 to the multi function product 11 according to the IP address. Further, the image information transmission processing unit transmits the image data thus converted to the personal computer p1, thereby completing the process.

When the multi function product 11 determines that it is not possible to perform the image conversion to the image format thus specified, the main control unit 15 refers to the detail information and determines whether the personal computer p1 can perform the image conversion to the image format thus specified.

As shown in FIG. 28, when the personal computer p1 can perform the image conversion to the image format thus specified (the image format support determination result is yes), and the detail information is stored in the storage unit 17, the image information transmission processing unit connects the personal computer p1 to the multi function product 11 according to the IP address. Further, the image information transmission processing unit transmits the read data to the personal computer p1, and notifies the image format thus specified to the personal computer p1, so that the image information transmission processing unit instructs the personal computer p1 to convert to the image data with the image format thus specified.

As shown in FIG. 29, when both the multi function product 11 and the personal computer p1 cannot perform the image conversion to the image format thus specified (the image format support determination result is no), the terminal device determination processing unit displays the warning on the display unit of the operation unit 16 indicating that it is not possible to convert to the image format thus specified. Then, the terminal device determination processing unit sends the instruction to the reading control unit 21 to stop reading the image of the original (reading termination), thereby completing the process.

As shown in FIG. 30, when the terminal device determination processing unit determines that a plurality of the personal computers has the matched terminal information, the terminal device determination processing unit displays the warning on the display unit of the operation unit 16 indicating that a plurality of the personal computers has the matched terminal information. Further, the terminal device determination processing unit sends the instruction to the reading control unit 21 to stop reading the image of the original (reading termination), thereby completing the process.

An operation of the personal computer p1 will be explained next. First, the terminal information matching determination processing unit of the main control unit 25 performs the terminal information matching determination processing. When the transmission reception unit 28 receives the information acquisition request, the terminal information and the image format from the multi function product 11, the determining unit 29 compares the terminal information transmitted from the multi function product 11 with the terminal information stored in the terminal information storage unit 27. Accordingly, the determining unit 29 determines whether the terminal information transmitted from the multi function product 11 matches to the terminal information stored in the terminal information storage unit 27.

Further, an image format support determination processing unit of the main control unit 25 performs an image format support determination processing. Accordingly, the image conversion determining unit 31 determines whether it is possible to perform the image conversion to the image format thus specified.

In the next step, the answer information transmission processing unit of the main control unit 25 sends a determination result of the terminal information matching determination processing unit and a determination result of the image format support determination processing unit as answer information to the multi function product 11.

More specifically, when the determining unit 29 determines that the terminal information transmitted from the multi function product 11 matches to the terminal information stored in the terminal information storage unit 27, and the image conversion determining unit 31 determines that it is possible to perform the image conversion to the image format thus specified, the answer information transmission processing unit of the main control unit 25 performs the answer information transmission processing. Accordingly, the transmission reception unit 28 sends the response indicating that the terminal information matches, the response indicating that it is possible to perform the image conversion to the image format thus specified, and the detail information of the personal computer p1 to the multi function product 11.

When the determining unit 29 determines that the terminal information transmitted from the multi function product 11 does not match to the terminal information stored in the terminal information storage unit 27, the answer information transmission processing unit controls the transmission reception unit 28 to transmit a response indicating that the terminal information does not match to the multi function product 11.

Further, when the image conversion determining unit 31 determines that it is not possible to perform the image conversion to the image format thus specified, the answer information transmission processing unit controls the transmission reception unit 28 to transmit a response indicating that it is not possible to perform the image conversion to the image format thus specified to the multi function product 11.

When the transmission reception unit 28 sends the response indicating that the terminal information matches, the response indicating that it is possible to perform the image conversion to the image format thus specified, and the detail information of the personal computer p1 to the multi function product 11, the multi function product 11 transmits the read data to the personal computer p1. Accordingly, the image information reception processing unit of the main control unit 25 performs the image information reception processing, so that the transmission reception unit 28 receives the image data.

After the transmission reception unit 28 receives the image data, the read data thus received are converted to the image data with the image format thus specified, and the image data thus received are stored in the image data storage unit 30, thereby completing the process.

When the multi function product 11 converts the read data to the image data with the image format thus specified, the multi function product 11 transmits the image data to the personal computer p1. Accordingly, the image information reception processing unit of the main control unit 25 performs the image information reception processing, so that the transmission reception unit 28 receives the image data. After the transmission reception unit 28 receives the image data, the image data thus received are stored in the image data storage unit 30, thereby completing the process.

As described above, in the embodiment, even when it is not possible to perform the image conversion to the image format thus specified in the multi function product 11, when it is possible to perform the image conversion to the image format thus specified in the personal computer p1, it is possible to transmit the read data as is to the personal computer p1.

The flow charts shown in FIGS. 20 to 22 will be explained next. In step S61, the terminal information of the personal computer p1 and the image format are input. In step S62, the push scan request is input. In step S63, the reading control unit 21 scans the original to start reading the image of the original. In step S64, it is determined whether it is possible to perform the image conversion to the image format thus specified. When it is possible to perform the image conversion to the image format thus specified, the process proceeds to step S66. When it is not possible to perform the image conversion to the image format thus specified, the process proceeds to step S65.

In step S65, the communication control unit 18 transmits the terminal information and the image format to one of the personal computers p1, p2, and p3. In step S66, the communication control unit 18 transmits the terminal information to one of the personal computers p1, p2, and p3. In step S67, the main control unit 15 starts the timer.

In step S68, it is determined whether the timer becomes timeout. When it is determined that the timer becomes timeout, the process proceeds to step S72. When it is determined that the timer does not become timeout, the process proceeds to step S69.

In step S69, it is determined whether the response is received from one of the personal computers p1, p2, and p3. When it is determined that the response is received from one of the personal computers p1, p2, and p3, the process proceeds to step S70. When it is determined that the response is not received from one of the personal computers p1, p2, and p3, the process returns to step S68.

In step S70, it is determined whether the response thus received is the response indicating that the terminal information is matched. When it is determined that the response thus received is the response indicating that the terminal information is matched, the process proceeds to step S71. When it is determined that the response thus received is not the response indicating that the terminal information is not matched, the process returns to step S68.

In step S71, the terminal information of one of the personal computers p1, p2, and p3 is stored in the storage unit 17, and the process returns to step S68. In step S72, it is determined whether the terminal information of one of the personal computers p1, p2, and p3 is stored in the storage unit 17. When it is determined that the terminal information of the personal computer p1 is stored in the storage unit 17, the process proceeds to step S75. When it is determined that the terminal information of the personal computer p1 is not stored in the storage unit 17, the process proceeds to step S73.

In step S73, the warning is displayed on the display unit of the operation unit 16 indicating that there is not the personal computers p1, p2, and p3. In step S74, the instruction is sent to the reading control unit 21 to stop reading the image of the original, thereby completing the process.

In step S75, it is determined whether there is only one personal computer. When it is determined that there is only one personal computer, the process proceeds to step S78. When it is determined that there is a plurality of the personal computers, the process proceeds to step S76. In step S76, the warning is displayed on the display unit of the operation unit 16 indicating that there is a plurality of the personal computers. In step S77, the instruction is sent to the reading control unit 21 to stop reading the image of the original, thereby completing the process. In step S78, the multi function product 11 waits until the image of the original is completely read.

In step S79, it is determined whether it is possible to perform the image conversion in the multi function product 11. When it is determined that it is possible to perform the image conversion in the multi function product 11, the process proceeds to step S80. When it is determined that it is not possible to perform the image conversion in the multi function product 11, the process proceeds to step S82.

In step S80, the image conversion is performed to the image format thus specified in the multi function product 11. In step S81, the image data are transmitted to the personal computer p1, thereby completing the process.

In step S82, it is determined whether it is possible to perform the image conversion in the personal computer p1. When it is determined that it is possible to perform the image conversion in the personal computer p1, the process proceeds to step S83. When it is determined that it is not possible to perform the image conversion in the personal computer p1, the process proceeds to step S84.

In step S83, the image data are transmitted to the personal computer p1, and the image conversion is performed in the personal computer p1, thereby completing the process. In step S84, the warning is displayed on the display unit indicating that it is not possible to perform the image conversion in the personal computer p1. In step S85, the instruction is sent to the reading control unit 21 to stop reading the image of the original, thereby completing the process.

The flow chart shown in FIG. 23 will be explained next. In step S91, the transmission reception unit 28 waits until the transmission reception unit 28 receives the information acquisition request, the terminal information and the image format from the multi function product 11. In step S92, the determining unit 29 compares the terminal information transmitted from the multi function product 11 with the terminal information stored in the terminal information storage unit 27.

In step S93, the determining unit 29 determines whether the terminal information transmitted from the multi function product 11 matches to the terminal information stored in the terminal information storage unit 27. When the determining unit 29 determines that the terminal information transmitted from the multi function product 11 matches to the terminal information stored in the terminal information storage unit 27, the process proceeds to step S95. When the determining unit 29 determines that the terminal information transmitted from the multi function product 11 does not match to the terminal information stored in the terminal information storage unit 27, the process proceeds to step S94.

In step S94, the transmission reception unit 28 transmits the response to the multi function product 11 indicating that the terminal information does not match, thereby completing the process. In step S95, it is determined whether it is possible to perform the image conversion to the image format thus specified. When it is determined that it is possible to perform the image conversion to the image format thus specified, the process proceeds to step S96. When it is determined that it is not possible to perform the image conversion to the image format thus specified, the process proceeds to step S97.

In step S96, the transmission reception unit 28 transmits the response to the multi function product 11 indicating that the terminal information matches and it is possible to perform the image conversion to the image format thus specified. In step S97, the transmission reception unit 28 transmits the response to the multi function product 11 indicating that the terminal information matches and it is not possible to perform the image conversion to the image format thus specified, thereby completing the process. In step S98, the transmission reception unit 28 waits until the transmission reception unit 28 receives the image data. In step S99, the read data thus received are converted to the image data, and the image data are stored in the image data storage unit 30, thereby completing the process.

As described above, in the embodiment, it is configured such that the personal computer p1 determines whether the terminal information matches. Alternatively, it may be configured such that the multi function product 11 determines whether the terminal information matches.

In the embodiments described above, the multi function product 11 transmits the image data to the personal computers p1, p2, and p3. Alternatively, it may be configured such that an image reading apparatus such as a copier, a facsimile, a scanner transmits the image data to the personal computers p1, p2, and p3. Further, it may be configured such that an image reading apparatus such as a copier, a facsimile, a scanner transmits the image data to a printer as a terminal device.

The disclosure of Japanese Patent Application No. 2009-138287, filed on Jun. 9, 2009, is incorporated in the application.

While the invention has been explained with reference to the specific embodiments of the invention, the explanation is illustrative and the invention is limited only by the appended claims.

What is claimed is:

1. An image processing apparatus comprising:
 a capturing unit for capturing an image;
 an operation unit for inputting information specifying a specific information processing device among a plurality of information processing devices;
 an information request processing unit for externally transmitting an information acquisition request including concurrent notification information and identification information identifying the specific information processing device;
 a destination determination processing unit for determining a transmission destination according to answer information relative to the information acquisition request; and
 an image information transmission processing unit for transmitting the image captured with the capturing unit to the transmission destination determined with the destination determination processing unit.

2. The image processing apparatus according to claim 1, wherein said information request processing unit is configured to externally transmitting the information acquisition request including the identification information and the concurrent notification information that is broadcast information.

3. The image processing apparatus according to claim 1, wherein said information request processing unit is configured to externally transmitting the information acquisition request including the identification information and the concurrent notification information that is multicast information.

4. An image processing apparatus comprising:
 a capturing unit for capturing an image;
 an operation unit for inputting information specifying a specific information processing device among a plurality of information processing devices;
 an information request processing unit for transmitting an information acquisition request to each of the information processing devices through concurrent notification;
 a destination determination processing unit for determining a transmission destination according to answer information transmitted from each of the information processing devices relative to the information acquisition request and the information input through the operation unit; and an image information transmission processing unit for transmitting the image captured with the capturing unit to the transmission destination determined with the destination determination processing unit.

5. The image processing apparatus according to claim 4, wherein said information request processing unit is configured to transmit the information acquisition request to each of the information processing devices through the concurrent notification that is broadcast.

6. The image processing apparatus according to claim 4, wherein said information request processing unit is configured to transmit the information acquisition request to each of the information processing devices through the concurrent notification that is multicast.

7. A method of transmitting an image, comprising the steps of:
  capturing the image;
  inputting information specifying a specific information processing device among a plurality of information processing devices;
  transmitting an information acquisition request to each of the information processing devices through concurrent notification;
  determining a transmission destination according to answer information transmitted from each of the information processing devices relative to the information acquisition request and the information input through an operation unit; and
  transmitting the image captured with a capturing unit to the transmission destination determined with a destination determination processing unit.

8. The method of transmitting the image according to claim 7, wherein said information acquisition request is transmitted to each of the information processing devices through the concurrent notification that is broadcast.

9. The method of transmitting the image according to claim 7, wherein said information acquisition request is transmitted to each of the information processing devices through the concurrent notification that is multicast.

10. An image processing apparatus comprising:
  a capturing unit for capturing an image;
  an operation unit for inputting information specifying a specific information processing device among a plurality of information processing devices;
  an information request processing unit for transmitting an information acquisition request to each of the information processing devices;
  a destination determination processing unit for determining a transmission destination according to answer information transmitted from each of the information processing devices relative to the information acquisition request and the information input through the operation unit; and
  an image information transmission processing unit for transmitting the image captured with the capturing unit to the transmission destination determined with the destination determination processing unit.

* * * * *